United States Patent
Resch et al.

(12) 
(10) Patent No.: US 9,105,300 B2
(45) Date of Patent: Aug. 11, 2015

(54) METADATA TIME MARKING INFORMATION FOR INDICATING A SECTION OF AN AUDIO OBJECT

(75) Inventors: Barbara Resch, Solna (SE); Jonas Engdegård, Stockholm (SE)

(73) Assignee: Dolby International AB, Amsterdam Zuidoost (NL)

( * ) Notice: Subject to any disclaimer, the term of this patent is extended or adjusted under 35 U.S.C. 154(b) by 564 days.

(21) Appl. No.: 13/499,892

(22) PCT Filed: Oct. 14, 2010

(86) PCT No.: PCT/EP2010/065463
§ 371 (c)(1),
(2), (4) Date: Apr. 2, 2012

(87) PCT Pub. No.: WO2011/048010
PCT Pub. Date: Apr. 28, 2011

(65) Prior Publication Data
US 2012/0197650 A1 Aug. 2, 2012

Related U.S. Application Data (60) Provisional application No. 61/252,788, filed on Oct. 19, 2009.

(51) Int. Cl.
*G10L 21/04* (2013.01)
*G11B 27/034* (2006.01)
*G10L 25/00* (2013.01)

(52) U.S. Cl.
CPC .............. *G11B 27/034* (2013.01); *G10L 21/04* (2013.01); *G10L 25/00* (2013.01)

(58) Field of Classification Search
CPC ............... G11B 27/002; G11B 27/034; G11B 20/00007; G11B 20/00992; G11B 20/10527; G11B 27/031; G11B 27/105; G06F 17/30038; G06F 17/30053; G09B 5/04; G10L 2021/0575; H04S 3/00; H04S 2420/03

USPC ............... 704/200, 200.1, 500–504, 278; 709/242, 204, 205; 370/352; 455/3.06; 725/45, 112, 113; 707/999.107; 369/1; 84/609; 713/863, 201; 345/473, 163; 701/3, 14, 33.4

See application file for complete search history.

(56) References Cited

U.S. PATENT DOCUMENTS

| | | | |
|---|---|---|---|
| 5,463,424 A | 10/1995 | Dressler | |
| 5,583,962 A | 12/1996 | Davis et al. | |

(Continued)

FOREIGN PATENT DOCUMENTS

| | | |
|---|---|---|
| CN | 101002269 | 7/2007 |
| JP | 9090978 | 4/1997 |

(Continued)

OTHER PUBLICATIONS

Kosonen et al., (Rhythm metadata enabled intra-track navigation and content modification in a music player, Proceeding MUM '06 Proceedings of the 5th International Conference on Mobile and Ubiquitous Multimedia, Dec. 4-6, 2006, pp. 87-94.*

(Continued)

*Primary Examiner* — Vijay B Chawan (57) ABSTRACT

The application relates to a method for encoding time marking information within audio data. According to the method, time marking information is encoded as audio metadata within the audio data. The time marking information indicates at least one section of an audio object encoded in the audio data. E.g. the time marking information may specify a start position and an end position of the section or only a start position. The at least one section may be a characteristic part of the audio object, which allows instant recognition by listening. The time marking information encoded in the audio data enables instantaneous browsing to a certain section of the audio object. The application further relates to a method for decoding the time marking information encoded in the audio data.

19 Claims, 1 Drawing Sheet

(56) References Cited

U.S. PATENT DOCUMENTS

| | | | |
|---|---|---|---|
| 5,890,125 | A | 3/1999 | Davis |
| 6,240,388 | B1 | 5/2001 | Fukuchi |
| 6,345,252 | B1 | 2/2002 | Beigi |
| 6,633,845 | B1 | 10/2003 | Logan |
| 6,708,145 | B1 | 3/2004 | Liljeryd |
| 6,747,201 | B2 | 6/2004 | Birmingham |
| 6,978,236 | B1 | 12/2005 | Liljeryd |
| 7,003,451 | B2 | 2/2006 | Kjoerling |
| 7,050,972 | B2 | 5/2006 | Henn |
| 7,181,389 | B2 | 2/2007 | Liljeryd |
| 7,191,121 | B2 | 3/2007 | Liljeryd |
| 7,232,948 | B2 | 6/2007 | Zhang |
| 7,283,955 | B2 | 10/2007 | Ekstrand |
| 7,382,886 | B2 | 6/2008 | Henn |
| 7,433,817 | B2 | 10/2008 | Kjoerling |
| 7,469,206 | B2 | 12/2008 | Kjoerling |
| 7,473,839 | B2 | 1/2009 | Gimarc |
| 7,483,758 | B2 | 1/2009 | Liljeryd |
| 7,487,097 | B2 | 2/2009 | Engdegard |
| 7,548,864 | B2 | 6/2009 | Kjoerling |
| 7,564,978 | B2 | 7/2009 | Engdegard |
| 7,577,570 | B2 | 8/2009 | Kjoerling |
| 7,590,543 | B2 | 9/2009 | Kjoerling |
| 7,680,552 | B2 | 3/2010 | Liljeryd |
| 8,019,612 | B2 | 9/2011 | Kjoerling |
| 8,036,880 | B2 | 10/2011 | Liljeryd |
| 8,036,881 | B2 | 10/2011 | Liljeryd |
| 8,036,882 | B2 | 10/2011 | Liljeryd |
| 8,059,826 | B2 | 11/2011 | Henn |
| 8,112,284 | B2 | 2/2012 | Kjoerling |
| 2002/0040295 | A1* | 4/2002 | Saunders et al. ............... 704/200 |
| 2002/0064476 | A1* | 5/2002 | Omori et al. .................... 419/61 |
| 2002/0085456 | A1* | 7/2002 | Yanagisawa et al. ............ 369/1 |
| 2003/0225834 | A1* | 12/2003 | Lee et al. ...................... 709/204 |
| 2004/0064209 | A1 | 4/2004 | Zhang |
| 2004/0064476 | A1* | 4/2004 | Rounds ...................... 707/104.1 |
| 2005/0204385 | A1* | 9/2005 | Sull et al. ........................ 725/45 |
| 2006/0080356 | A1 | 4/2006 | Burges |
| 2007/0288517 | A1 | 12/2007 | Takatsuka |
| 2008/0059160 | A1* | 3/2008 | Saunders et al. ............... 704/225 |
| 2008/0160910 | A1* | 7/2008 | Khedouri et al. ............ 455/3.06 |
| 2008/0190272 | A1 | 8/2008 | Taub |
| 2008/0192736 | A1* | 8/2008 | Jabri et al. .................... 370/352 |
| 2008/0209484 | A1 | 8/2008 | Xu |
| 2009/0005890 | A1 | 1/2009 | Zhang |
| 2009/0044686 | A1 | 2/2009 | Vasa |
| 2010/0042654 | A1* | 2/2010 | Heller et al. ............... 707/104.1 |
| 2010/0083344 | A1 | 4/2010 | Schildbach |
| 2011/0051800 | A1 | 3/2011 | Schug |
| 2011/0208528 | A1 | 8/2011 | Schildbach |
| 2012/0019723 | A1 | 1/2012 | McGrath |

FOREIGN PATENT DOCUMENTS

| | | |
|---|---|---|
| JP | 2004-233965 | 8/2004 |
| JP | 2006-163063 | 6/2006 |
| JP | 2007-248895 | 9/2007 |
| KR | 2008-0006683 | 1/2008 |
| WO | 2006096664 | 9/2006 |
| WO | 2007127695 | 11/2007 |
| WO | 2009/101703 | 8/2009 |
| WO | 2011/015369 | 2/2011 |
| WO | 2011/042149 | 4/2011 |
| WO | 2011/073201 | 6/2011 |
| WO | 2011/100155 | 8/2011 |

OTHER PUBLICATIONS

Brazil, Eoin "Cue Point Processing: An Introduction" Proc. of the Cost G-6 Conference on Digital Audio Effects, Limerick, Ireland, Dec. 6-8, 2001.

Boutard, G. et al "Browsing Inside a Music Track, the Experimentation Case Study" Dec. 22, 2006, Learning the Semantics of Audio Signals (LSAS) pp. 87-93.

Chai, W., et al., "Music Thumbnailing via Structural Analysis", 2003 Multimedia Conference—Proceedings of the 11th ACM International Conference on Multimedia, published Dec. 2003.

Goto, M., "SmartMusicKiosk: Music Listening Station with Chorus-Search Function", Transactions of the Information Processing Society of Japan, vol. 44, No. 11, pp. 2737-2747, published in Nov. 2003.

Goto, M., "A Chorus Section Detection Method for Musical Audio Signals and its Application to a Music Listening Station" Audio, Speech, and Language Processing, IEEE Transaction, published on Sep. 2006, vol. 14, Issue 5, pp. 1783-1794.

Goto, M., "A Chorus-Section Detecting Method for Musical Audio Signals" ICASSP 2003, vol. 5, pp. 437-440.

Chai, W., et al., "Structural Analysis of Musical Signals for Indexing and Thumbnailing" Joint Conference on Digital Libraries, May 27-31, 2003, pp. 27-34.

Bartsch, M.A., et al., "Audio Thumbnailing of Popular Music Using Chroma-Based Representations" IEEE Transactions on Multimedia, vol. 7, No. 1, Feb. 2005, pp. 96-104.

Bartsch, M.A., et al., "To Catch a Chorus: Using Chroma-Based Representations for Audio Thumbnailing" 2001 Workshop on the IEEE, pp. 15-18.

Zhu, Song-Hao, et al., "Automatic Artist Recognition of Songs Using a Hierarchic Structure" China-Ireland International Conference on Information and Communications Technologies, 2007.

Yu, J., et al., "Chinese Folk Musical Instruments Recognition in Polyphonic Music", Audio, Language and Image Processing, 2008, ICALIP 2008, pp. 1145-1152.

Nwe, Tin Lay, et al., "On Fusion of Timbre-Motivated Features for Singing Voice Detection and Singer Identification" ICASSP 2008, pp. 2225-2228.

Zhu, Y., et al., "Multimodal Content-Based Structure Analysis of Karaoke Music" Multimedia 2005, Proceedings of the 13th Annual ACM International Conference, pp. 638-647.

Seifert, F., "Prediction-Driven Correlation of Audio with Generic Music Templates" published in 2005.

Guo, Meng, "Automatic Summarization for Popular Songs" ICALIP 2008, Jul. 7-9, 2008, pp. 653-658.

Nwe, et al., "Singing Voice Detection Using Perceptually-Motivated Features" Proceedings of the Fifteenth ACM International Conference on Multimedia, published in Dec. 2007.

Levy, M., et al., "Application of Segmentation and Thumbnailing to Music Browsing and Searching" AES Convention presented at the 120th Convention on May 20-23, 2006.

Aucouturier, J.J., et al., "Finding Repeating Patterns in Acoustic Musical Signals: Applications for Audio Thumbnailing" AES Conference: 22nd International Conference, Jun. 2002.

Eronen, Antti, "Chorus Detection with Combined Use of MFCC and Chroma Features and Image Processing Filters" 10th International Conference on Digital Audio Effects Sep. 10-15, 2007, Bordeaux, France.

ISO/IEC 11172-3, 1993, 2 pages.
ISO/IEC 13818-3, Apr. 15, 1998, 2 pages.
ISO/IEC 13818-7, 2006, 2 pages.
ISO/IEC 14496-3, 2009, 2 pages.
ISO/IEC 14496-12, 2005, 2 pages.

* cited by examiner

METADATA TIME MARKING INFORMATION FOR INDICATING A SECTION OF AN AUDIO OBJECT

TECHNICAL FIELD

The application relates to audio coding, in particular to metadata within audio data for indicating a section of an audio object.

BACKGROUND OF THE INVENTION

A piece of music can be often identified by hearing to a characteristic part, such as the chorus of the refrain, of the piece of music. Also, hearing a characteristic part of the piece of music may be sufficient for assessing whether a music consumer likes or dislikes a piece of music. When a music consumer seeks the characteristic part of a piece of music stored as digital audio data, the music consumer has to manually fast-forward within the piece of music to find the characteristic part. This is cumbersome, in particular in case the music consumer browses through multiple pieces of music within a large music collection to find a particular piece of music.

SUMMARY OF THE INVENTION

A first aspect of the invention relates to a method for encoding time marking information within audio data.

Preferably, the encoded audio data including the time marking formation is stored in a single audio file, such as an MP3 (MPEG-1 Audio Layer 3) file or an AAC (Advanced Audio Coding) file.

According to the method, time marking information is encoded as audio metadata in the audio data. The time marking information indicates at least one section of an audio object encoded in the audio data. E.g. the time marking information may specify a start position and an end position of the section or only a start position.

The at least one section may be a characteristic part of the audio object. Such characteristic part often allows instant recognition of the audio object by listening to the characteristic part.

This time marking information encoded in the audio data enables instantaneous browsing to a certain section of the audio object. Thus, manual seeking through the audio object to find a certain section is avoided.

This time marking information encoded in the audio data enables the extraction of a certain section, e.g., a characteristic section, in particular the chorus. The section can be used as a ringtone, or alarm signal. For this purpose the section can be stored in a new file, or the time marking in the audio data can be used to start the playback at the specific section when the ringtone or alarm tone or signal is played.

When the at least one section is a characteristic part (i.e. a significant part or representative part) of the audio object, the marked section in combination with the time marking information provides an audio thumbnail of the audio object that enables instant recognition by listening.

Even if the consumer equipment supports automatic analysis of the audio data to find a certain section, such as the characteristic section of a piece of music, such an analysis for finding the section is not needed since the time marking information was already identified in advance and included in the audio data.

It should be noted that the audio data may be pure audio data, multiplexed multimedia video/audio data (such as a MPEG-4 video/audio bitstream or a MPEG-2 video/audio bitstream), or the audio part of such multiplexed video/audio data.

The time marking information may be encoded when generating the audio data or the time marking information may be included in a given audio data.

The audio data output from the encoder or the audio data input to an audio decoder typically forms a bitstream. Thus, throughout the application the term "bitstream" may be used instead of the term "audio data". The encoded audio data comprising the time marking information is preferably stored in a single file stored on a storage medium.

Nevertheless, the encoded audio data (in other words: the encoded bitstream) may be generated by multiplexing information from separate files, one audio file having audio information and one metadata file having one or more time markers.

The audio data may be used in a streaming application, such as an internet radio bitstream or multi-media bitstream comprising video and audio. Alternatively, the audio data may be stored in a memory medium at the consumer, such as a flash-memory or a hard-disk.

Preferably, the audio object is encoded by a perceptual encoding method, such as the encoding method used in MP3, Dolby Digital, or (HE-)AAC. Alternatively, the audio object may be a PCM (pulse code modulation) encoded audio object.

E.g. the audio object may be a piece of music or a recording of speech, such as an audio book.

Preferably, the encoding of the time marking information allows for forward compatibility, i.e. the encoding of the time marking information is performed in such a way that a decoder not supporting the time marking information can skip this information.

Preferably, both backward and forward compatibility is achieved. Backward compatibility means that a decoder supporting the time marking information (e.g. an HE-AAC decoder having an extractor and processor for time marking metadata) can read both conventional audio data without time marking information (e.g. a conventional HE-AAC bitstream) and audio data having time marking information (e.g. an HE-AAC bitstream having addition time marking metadata). Forward compatibility means that a decoder not supporting the time marking information (e.g. a conventional HE-AAC decoder) can read conventional audio data without time marking information and the conventional parts of audio data having time marking information (in this case the time marking information is skipped since it is not supported).

According to an embodiment, the time marking information indicates the position of a characteristic part of an audio object. E.g. in case of a piece of music the time marking information may indicate the chorus, the refrain or a part thereof. In other words: the time marking metadata points to a significant or representative part. This enables the music player which decodes an audio bitstream to start the playback at the significant instant.

The time marking information may indicate a plurality of sections within the audio object, e.g. within a piece of music or an audio book. In other words: the time marking information may comprise a plurality of time markers associated with a plurality of sections of the audio object. E.g. the time marking information may state the time positions of the start and end points of a plurality of sections. This allows browsing to different sections within the audio object.

The time marking information may specify different positions in time that are related to the temporal musical structure of the piece of music. In other words: the time marking information may indicate a plurality of sections within the piece of music, with the sections relating to different sections of the temporal musical structure. E.g. the time marking information may indicate the beginning of one or more of the following sections: e.g. introduction, first verse, first refrain or chorus, second (third) verse, second (third) refrain or chorus, or a bridge.

The time marking information may also mark motives, themes and/or variations of the theme within the piece of music.

Furthermore, the time marking information may specify other musical aspects, such as the occurrence of a singing voice (e.g. the first vocal entry) or may relate to the music arrangement, such as the occurrence of a specific instrument (in particular the solo appearance of a certain instrument) or instrument group (e.g. brass section, backing vocals), or the loudest part within the piece of music.

The time marking information may also indicate a section having a particular musical property. The musical property may be e.g. a particular musical style or genre, a particular mood, a particular tempo, a particular tonality, a particular articulation.

The time marked section may be associated with labeling information used for labeling the section. E.g. the labeling information may describe certain musical properties for the section, such as the specification of the musical style or genre (e.g. soft, classical, electronic etc.), the specification of an associated mood (e.g. happy, sad, aggressive), the tempo (e.g. the speed or pace of the audio signal specified in beats per minutes or labeled by musical terms such as e.g. allegro, andante etc.), the tonality of a section of the audio signal (e.g. A major, C minor), or the articulation (e.g. portato, legato, pizzicato).

The labeling information may be contained in another metadata field. The labeling information may contain a text label. Alternatively, for labeling, the time markers may be also associated with the index in a table that e.g. specifies the musical structure or musical properties as discussed above. In this case, the index for the respective label is included in the audio data as labeling information. An example of such a lookup table is shown below:

| Index | label |
|-------|-------|
| 0 | "CHORUS" |
| 1 | "VERSE" |
| 2 | "SOLO" |
| 3 | "VOCAL_ENTRY" |

In this example, only the index (here: 4 states, hence 2 bits) is to be conveyed in the audio bitstream. The lookup table is typically known to the decoder. However, it may be also possible to also convey the table in the audio bitstream.

The time marking information with its associated one or more labels (e.g. encoded in the metadata as a text label or as an index of a lookup table which allows extraction of labels from the table) enable the user to easily browse through a large database of audio objects, such as a large collection of pieces of music, to find certain parts (e.g. guitar solos).

The time marking information may further allow looped playback over parts of interest (e.g. guitar solo, vocal part, refrain) which facilitates rehearsal and practicing of an instrumental or vocal part of the piece of music.

The time marking information may be stored as metadata in an audio file, e.g. an AAC file or an MP3 file, and the time information (e.g. beginning point and end point of a particular section, or the beginning point and the duration of the particular section) may be coded in one or more of the following formats:

- a second value (e.g. 20 seconds) and optional a fractional second value (e.g. 0.2 seconds)
- a sample number (e.g. a 28 bit wide sample number field covers more than 1 hour at a sampling rate of 44100 Hz)
- a frame number (e.g. an 18 bit wide frame number field covers more than 1 hour at a sampling rate of 44100 Hz and 1024 samples per frame)
- an integer frame number and an integer sample number, or
- an integer frame number and a fractional frame value (e.g. 18 bit wide frame counter plus a 2 bit wide fractional frame value results in a precision of 5 milliseconds at a sampling rate of 44100 Hz and 1024 samples per frame).

The degree of accuracy of the above formats for encoding the time information is different. The used format typically depends on the requirements of the application. For a "chorus finder" application, the time resolution is not so critical and thus the format does not need to have a high accuracy. But for an "instrument-practice-play-along" application utilizing very exact loops, the time resolution requirements may be higher and thus a format with high accuracy is preferably used.

The time marking metadata may be included (e.g. once) in the beginning of the audio data (e.g. in the header of the audio bitstream).

Alternatively, time marking information may be encoded in multiple sections of the audio data. E.g. the multiple sections may occur at a particular occurrence rate in the bitstream (e.g. once per n seconds or once per n audio frames, with n≥1, e.g. n=1). In other words, the time marking information may be encoded at a certain fixed update rate.

In case of encoding time marking information in multiple sections, time marking information in a given section of the multiple sections may be specified in relation to the occurrence of the given section within the bitstream. In other words: the time specification of the time markers may be defined relative to the point of time where the metadata is inserted. E.g. the time markers may specify the distance in time between the regularly spaced metadata update positions and the sections of interest (e.g. 3 seconds until the chorus of the audio signal starts).

Including the time marking information at a certain update rate facilitates the browsing functionality for streaming applications, e.g. for broadcasting.

Further embodiments of the encoding method are given in the dependent claims.

A second aspect of the application relates to a method for decoding time marking information provided in audio data. According to the method, time marking information provided as audio metadata is decoded. The decoding is typically performed together with the decoding of the audio object given in the audio data. The time marking information indicates at least one section (e.g. the most characteristic part) of the audio object encoded in the audio data as already discussed in connection with the first aspect of the invention.

The above remarks relating to the encoding method according to the first aspect of the application also apply to the decoding method according to the second aspect of the application.

According to an embodiment, after the time marking information is decoded, playback starts at the beginning of the marked section, with the beginning of the marked section being specified by the time marking information. For starting playback at the beginning of the marked section, the decoder may start decoding at the marked section. The start of playback at the beginning of the marked section may be initiated by a user input. Alternatively, playback may start automatically, e.g. in case of playback of the characteristic part of a plurality of songs.

Preferably, playback of the section stops at the end of the section, with the end indicated by the time marking information. In a loop mode, playback may thereafter start again at the beginning of the section.

The decoding of the time marking information and playback at the beginning of the respective section may be performed for a plurality of audio objects. This allows browsing through a plurality of songs, e.g. browsing the most characteristic parts of songs in a large music collection.

Encoded time marking information indicating a characteristic part of a piece of music also facilitates browsing different radio channels, e.g. different internet radio channels.

For browsing different radio channels, time marking information in a plurality of audio bitstreams associated with a plurality of radio channels is decoded. For each of the plurality of bitstream one after another, playback at the beginning of at least one respective section indicated by the time marking information of the respective bitstream is started. Thus, according to the embodiment, a characteristic section of a song (or the characteristic sections of multiple songs) on a first radio channel may be played. Thereafter, a characteristic section of a song (or the characteristic sections of multiple songs) on a second radio channel (and thereafter on the third radio channel) may be played. This enables the radio consumer to get an impression of the type of music which is played on the various radio channels.

The method may be also used to playback a medley of various songs played on a given radio channel: For generating such a medley, time marking information of a plurality of audio objects within a bitstream of a radio channel is decoded. For each of the plurality of audio objects one after another, a respective section of the respective audio object is played back. Said method may be also performed for a plurality of a radio channels. This allows to playback a medley of songs per each of the plurality of radio channels to provide an impression on which type of music is played on various channels.

The concepts discussed above may be used in connection with both real-time radio and on-demand radio. In real-time radio the user typically cannot jump to a particular point in a radio program (in real-time radio the user may possibly jump to a past point in a radio program in dependency of the buffer size). On demand-radio allows the listener to start and stop at any point in the radio program.

In case of real-time radio, the playback device has preferably the capability to store a certain amount of music in memory. By decoding the time marking information, the device may capture a significant part of each of one or more last songs of one or more radio channels and may store these significant parts for later playback in memory. The playback device may record the received continuous audio stream of a radio channel and may optionally delete non-significant parts later (to free up memory), or the playback device may directly record the significant parts.

The same concepts can be also used for television over the internet.

According to an embodiment, the marked section may be used as a ringtone or alarm signal. For this purpose, the section may be stored in a different file used for playback of the ringtone or alarm signal, or the time marking information indicating the section is used to start the playback at the beginning of the section for playback of the ringtone or alarm signal.

A third aspect of the application relates to an encoder configured to encode time marking information as audio metadata in the audio data, with the time marking information indicating at least one section of an audio object encoded in the audio data.

The above remarks relating to the encoding method according to the first aspect of the application also apply to the encoder according to the third aspect of the application.

A fourth aspect of the application relates to a decoder configured to decode time marking information provided as audio metadata in the audio data, with the time marking information indicating at least one section of an audio object encoded in the audio data.

The above remarks relating to the decoding method according to the first aspect of the application also apply to the decoder according to the fourth aspect of the application.

The decoder may be used in an audio player, e.g. music player, such as in a portable music player having a flash-memory and/or a hard-disk. The term "portable music player" also covers a cellular telephone having music player functionality. When the audio decoder allows to browse through the songs by playback of the respective characteristic part of each of the songs, a display for displaying the song name may be omitted. This allows to further reduce the music player size and to reduce the device's costs.

A fifth aspect of the application relates to audio data, e.g. an audio bitstream. The audio data comprises time marking information as audio metadata. The time marking information indicates at least one section of an audio object encoded in the audio data. The audio data may be a bitstream streamed from a server to the client (i.e. consumer), such as an (internet) radio bitstream. Alternatively, the audio data may be contained in a file stored on a memory medium, such as a flash-memory or a hard-disk. E.g. the audio data may be an AAC (Advanced Audio Coding), an HE-AAC (High-Efficiency AAC), a Dolby Pulse, an MP3 or a Dolby Digital bitstream. Dolby Pulse is based on HE-AAC v2 (HE-AAC version 2), but offers further metadata. Throughout the application, the term "AAC" covers all extended versions of AAC, such as HE-AAC or Dolby Pulse. The term "HE-AAC" (as well as "HE-AAC v1" and "HE-AAC v2") also covers Dolby Pulse. The audio data may be multimedia data comprising both audio and video information.

DESCRIPTION OF THE DRAWINGS

The invention is explained below by way of various illustrative examples with reference to the accompanying drawings, wherein.

DETAILED DESCRIPTION

In the following different use cases for metadata time information are discussed. The metadata time markers may indicate different types of sections and may be used in different applications.

Metadata Time Marking Information Indicating a Characteristic Part (E.G. Chorus) of a Song:

The time marking information may be used for indicating a characteristic part of a song (e.g. the chorus, refrain or a part thereof). Songs are often more easily identified by listening to a characteristic part (e.g. chorus) than by reading the song title. Using metadata time markers indicating characteristic parts of songs allows for searching of known songs and facilitates browsing by hearing through a database of songs. The music consumer can instantly recognize and identify songs when listening to the most significant part of the respective song. Furthermore, such a functionality is highly beneficial for browsing songs on a portable music player device without display at all, or in case the display is currently not visible to the user since the device is placed in a pocket or bag.

Time marking information indicating a characteristic part of a song is also useful in discovering new songs. From listening to a characteristic part (e.g. chorus) the user can easily determine if the user likes or dislikes a song. Thus, based on listing to the most characteristic part the user can decide whether the user likes to listen to the whole song, or if he is willing to pay money to buy the song. This functionality is e.g. a useful application for music stores and music discovery services.

Metadata Time Marking Information Related to Temporal Musical Structure of a Song:

The time marking information may be used for specifying different positions in time that are related to the temporal musical structure of a song, e.g. for indicating the positions of the intro, a verse, a refrain, a bridge, another refrain, another verse etc.

This enables the user to easily browse inside the song between the different parts of the song. The user can easily browse e.g. to the user's favorite part of the song.

Metadata time marking information relating to the musical structure is also beneficial for practicing a musical instrument or singing. Such time marking information provides the possibility of navigating through the different parts of the song, which allows to access a section of interest to play this section once or looped, while practicing a musical instrument or singing.

Metadata Time Marking Information Related to the Occurrence of a Specific Instrument or the Occurrence of a Singing Voice:

The time marking information may be also used for specifying the occurrence of a specific instrument or the occurrence of a singing voice and optionally a pitch range. Such time marking information is useful e.g. when practicing a musical instrument or singing. If the user is learning to play an instrument (e.g. the guitar), the user can easily find parts of songs that are interesting to play, such as guitar solos. For a singer it can be useful to find parts of songs that are in the desired pitch range.

Metadata Time Marking Information Indicating Sections with a Particular Musical Property:

Time marking information may be used for finding a section with a particular musical property, e.g. a musical descriptor on articulation (e.g. legato, pizzicato), style (e.g. allegro, andante) or tempo (e.g. beats per minute). This may e.g. help for practicing a musical instrument since the user can easily find relevant and interesting parts of the music for practicing. The playback may loop over such a specific part.

Metadata Time Marking Information Indicating Sections with Particular Mood or Tempo:

The metadata time marking information may indicate sections with a particular mood (e.g. energetic, aggressive, or calm) or tempo (e.g. beats per minute). Such metadata helps to find parts of songs according to the mood. The user can search for song sections with a specific mood. This allows also to design a medley of these sections from a plurality of songs or all available songs according to a specific mood.

Such metadata may be also used for finding suitable music for physical exercise (e.g. running, spinning, home trainer, or aerobics). The metadata may also facilitate adapting the music to the level of training intensity when training on different levels of intensity. Thus, the usage of such metadata helps the user to align a specific planned work out with suitable music. E.g. in case of interval training (alternation of shorter periods of high intensity work out followed by periods of rest) during a period with high intensity energetic, aggressive, or fast sections are played, whereas in a period of rest calm or slow sections are played.

In the different use cases of metadata time information as discussed above the time marking information is preferably integrated in audio files, e.g. in the header of a song file. Instead of a file based usage, metadata time marking information can be also used in the context of streaming applications, such as radio streaming applications (e.g. via the Internet). E.g. when having metadata time marking information indicating characteristic parts of songs (such as the chorus or a part thereof), such metadata can be used in the context of browsing different radio channels. Such metadata facilitates browsing different radio channels on a device that is capable to receive a number of radio stations (e.g. internet radio) and has the capability to store a certain amount of music in a memory, e.g. on a hard-disk or a flash-memory. By signaling the positions of significant parts (e.g. choruses) of the songs, the device can determine the significant part of each of the last songs (e.g. for the last n songs, with n≥1, e.g. n=5) for a plurality of the channels. The device may capture these significant parts and keep these sections in memory (and may delete the rest of the last songs to free up memory). The user can listen through this chorus collection for each channel and can easily get an idea what kind of music the channel is broadcasted at the moment and if the user likes it or not.

Metadata Time Marking Information Indicating Specific Sections of an Audio Object:

The time marking information may be used for indicating specific sections of an audio object containing speech and optional music and optional sounds, e.g. audio books, audio podcasts, education material. These sections can relate to the content of the audio object, e.g. specifying the chapters of an audio book or scenes of a theater piece, specifying several segments that provide a summary for the whole audio object. The sections can also relate to characteristics of the audio book, e.g. indicating if a section is cheerful or cheerless, e.g. in an audiobook that is a collection of stories. For educational audio material the time marking information may indicate different parts of the audio object regarding the difficulty of the material. The time marking information in educational material may also indicate sections that require active participation of the learner, e.g. comprehension questions, pronunciation exercises in language courses.

After discussing various exemplary applications for the metadata time marking information, exemplary sources for the time markers are discussed. The time markers that are written into the metadata may originate e.g. from one or more of the following sources:

Automatic extraction e.g. by Music Information Retrieval (MIR) algorithms or services at the consumer side (i.e. client side) or at the music provider side (i.e. server side). Examples for automatic extraction algorithms are discussed in the documents "A Chorus-Section Detection Method for Musical Audio Signals and Its Application to a Music Listening Station", Masataka Goto, IEEE Transactions on Audio, Speech and Language Processing, Vol. 14, No. 5, pp. 1783-1794, September 2006, and "To Catch a Chorus: Using Chroma-Based Representations for Audio Thumbnailing", M. A. Bartsch, M. A. and G. H. Wakefield, IEEE Workshop on Applications of Signal Processing to Audio and Acoustics, 2001. These documents are hereby incorporated by reference. Transfer from an external database. E.g. the audio library may be synchronized with an external database. The data may be fetched remotely as the external database hosting the metadata may be accessible e.g. via a computer network or a cellular network (similarly as for CDs getting artist/track information from Gracenote's Compact Disc Database (CDDB))

Manually entered in an editor at the client side (i.e. by the consumer).

In the following, various exemplary metadata containers for carrying the metadata time marking information are discussed. Conveying the metadata in an audio or multi-media bitstream can be done in numerous ways. It may be desired to include such data in a forward compatible fashion, i.e. non-destructively for a decoder not supporting extraction of the time marking metadata. For embedding the metadata in the audio data, one of the following commonly deployed metadata embedding methods may be used:

ID3 Containers

The ID3 tag (ID3—"Identify an MP3") is a metadata container often used together with MP3 (MPEG-1/2 Layer III) audio files. Its embedding is rather simple since the ID3 tag is basically inserted at the very beginning (in case of ID3v2) or appended at the end (in case of ID3v1) of the file. Forward compatibility is usually achieved, especially since ID3 tags have become a de facto standard for MP3 players. For carrying the time markers, an unused data field in an ID3 tag may be used (or a data fields for a different use may be diverted from its intended use), or the ID3 tag may be extended by one or more data fields for carrying the time markers.

Ancillary Data of MPEG-1/2

MPEG-1 or MPEG-2 Layer I/II/III audio bitstreams provide ancillary data containers that may be used for the time marking metadata. These ancillary data containers are described in the standardization documents ISO/IEC 11172-3 and ISO/IEC 13818-3, which are hereby incorporated by reference. Such an ancillary data container is signaled in a fully forward compatible way by the "AncDataElement( )" bitstream element, which allows for a data container of variable size. If the decoder does not support the time marking information, the decoder will typically ignore the extra data. This data container mechanism enables to convey metadata at any frame of a bitstream.

Extension Payload in MPEG-2/4 AAC Bitstream

For an MPEG-2 or MPEG-4 AAC (Advanced Audio Coding) audio bitstream, time marking information may be stored in a data container using the AAC "extension_payload( )" mechanism as described in the standardization documents ISO/IEC 13818-7 and ISO/IEC 14496-3. These documents are hereby incorporated by reference. This approach can be not only used in basic AAC but also in the extended versions of AAC, such as HE-AAC v1 (High-efficiency AAC version 1), HE-AAC v2 (High-efficiency AAC version 2) and Dolby Pulse. The "extension_payload( )" mechanism is signaled in a fully forward compatible way which allows for a data container of variable size. If the decoder does not support the time marking information encoded by the "extension_payload( )" mechanism, the decoder will typically ignore the extra data. This data container mechanism enables to convey metadata at any frame of a bitstream. Thus, the metadata may be continuously updated, e.g. for every frame. A detailed example for integrating time marking information in an AAC bitstream is discussed later in the application.

ISO Based Media File Format (MPEG-4 Part 12)

Alternatively, the ISO Based Media File Format (MPEG-4 Part 12) as defined in ISO/IEC 14496-12 may be used. That container standard has already a hierarchical infrastructure for metadata that can include e.g.:

iTunes metadata, an "extension_payload( )" element as part of an MPEG-4 AAC audio bitstream as discussed above, or a customized metadata section.

The ISO Based Media File Format may be used for including such time marking metadata in connection with Dolby Digital audio data or Dolby Pulse audio data or other audio data formats. E.g. time marking metadata may be added in a Dolby Pulse audio bitstream which further differentiates Dolby pulse from conventional HE-AAC.

Using the hierarchical structure defined in ISO/IEC 14496-12, metadata specific to e.g. Dolby Pulse or Dolby Media Generator can be included. The metadata is carried in the mp4 file within the "moov" atom. The "moov" atom contains a user data atom "udta" that identifies the content it carries by using a unique ID (universal unique identifier—"uuid"). This box can contain several meta atoms, each carrying different metadata types. The type is identified by a handler "hdlr". Already existing types might carry information about e.g. title, artist, genre, etc. A new type could be defined e.g. containing an Extensible Markup Language (XML) structure that contains the required information. The exact format would be determined based on the information that one would like to transmit. In the example below such structure is shown where the time marking metadata is part of the atom named "xml_data".

```
moov
    udta
        uuid "DLBY-METADATA-00"
            meta
                hdlr "dlbt" "dolby chorus metadata handler"
                xml_data
```

The time marking metadata atom "xml_data" coded in XML can be structured as in the example below.

```
<?xml version="1.0" encoding='UTF-8'?>
<PayloadInfo version="1.0.0.0">
    <DolbyChorus>
        <SectionID>VOCAL_ENTRY</SectionID>
        <Artist>Art Garfunkel</Artist>
        <TimeUnit>PCM_SAMPLES</TimeUnit>
        <Start>576284</Start>
        <Stop>815978</Stop>
    </DolbyChorus>
</PayloadInfo>
```

Such an atom can contain information about its size meaning that a parser that does not recognize the type can skip the section and continuing parsing the following data. Hence, forward compatibility is achieved.

Other Formats for Metadata

Other multimedia container formats that support metadata and may be used for carrying the time marking metadata are widely deployed industry standards such as MPEG-4 Part 14 (also called MP4 and defined in the standardization document ISO/IEC 14496-14) and the 3GP format.

In the following two examples of integrating time marking metadata in a bitstream syntax are discussed:

First Example of an Audio Thumbprint Bitstream Syntax

Some metadata container formats decree the use of text strings e.g. in an Extensible Markup Language (XML) framework, while others are just generic containers for binary data chunks Tab. 1 below shows an example of a binary format bitstream, specified in pseudo C syntax (which is common practice for ISO/IEC standard specifications). Bitstream elements with more than one bit are usually written/read as unsigned-integer-most-significant-bit-first ("uimsbf").

TABLE 1

Syntax of AudioThumbprintData( )

| Syntax | Number of bits |
|---|---|
| AudioThumbprintData( ) { | |
|    BS_SECTION_ID | 2 |
|    if (BS_SECTION_ID == 3) { | |
|      BS_NUM_CHAR | 8 |
|      for (i=0; i<BS_NUM_CHAR; i++) { | |
|        BS_ARTIST_STRING[i] | 8 |
|      } | |
|    } | |
|    BS_START | 18 |
|    BS_LENGTH | 14 |
| } | |

The bitstream elements have the following meanings

The integer element "BS_SECTION_ID" having e.g. a length of two bits describes the content type of the marked section, e.g. 0=CHORUS, 1=VERSE, 2=SOLO, 3=VOCAL_ENTRY.

The integer element "BS_NUM_CHAR" having e.g. a length of eight bits describes the length of the text string "BS_ARTIST_STRING" in bytes. In this example the integer element "BS_NUM_CHAR" and the text string "BS_ARTIST_STRING" are only used in a special case, namely when the integer element "BS_SECTION_ID" indicates a vocal entry; see the statement "if (BS_SECTION_ID==3)" in the pseudo C syntax.

The text string element "BS_ARTIST_STRING" contains the name of the vocal artist in the marked section. The text string may be coded e.g. in 8-bit ASCII (e.g. UTF-8 as specified in ISO/IEC10646:2003); in this case the bit length of the text string is 8·BS_NUM_CHAR.

The integer element "BS_START" indicates the start frame number of the marked section.

The integer element "BS_LENGTH" indicates the length of the marked section (here: expressed in number of frames).

A bitstream example according to the above pseudo C syntax is "11 00001101 01000001 01110010 01110100 00100000 01000111 01100001 01110010 01100110 01110101 01101110 01101011 01100101 01101100 001010111111001000 01100001101010".

The above exemplary bitstream specifies:

A VOCAL_ENTRY section with text tag "Art Garfunkel" starting at frame number 45000 and having a duration of 6250 frames (hence the section stops at frame 51250).

Second Example of an Audio Thumbprint Bitstream Syntax

The second example is based on the first example and uses the extension_payload( ) mechanism from ISO/IEC 14496-3. The syntax of the extension_payload( ) mechanism is described in table 4.51 in subclause 4.4.2.7 of ISO/IEC 14496-3:2001/FDAM:2003(E), which is hereby incorporated by reference.

In comparison to the syntax of the extension_payload( )mechanism in Tab. 4.51 in subclause 4.4.2.7 of ISO/IEC 14496-3:2001/FDAM:2003(E), in the second example an additional extension_type is added to the syntax of the extension_payload( ) as shown in Tab. 2, namely the extension_type "EXT_AUDIO_THUMBNAIL". If a decoder does not support this additional extension_type, this information is typically skipped. In Tab. 2, the additional bitstream element for the audio thumbprint is underlined. The extension_type "EXT_AUDIO_THUMBNAIL" is associated with the metadata "AudioThumbprintData( )", with an example of the syntax of "AudioThumbprintData( )" being illustrated in Tab. 3. The syntax of "AudioThumbprint Data( )" in Tab. 3 is similar to the syntax in Tab. 1. The definition of the bitstream elements "BS_SECTION_ID", "BS_NUM_ CHAR", "BS_ARTIST_STRING", "BS_START", and "BS_LENGTH" is identical to the definition as discussed in connection with Tab. 1. The variable "numAuThBits" counts the number of additional bits associated with AudioThumbprintData( ).

The variable "numAlignBits" corresponds to the number of fillbits that are needed, and is determined as the difference between the total number of bits in Extension_payload (variable "cnt" in byte) and the number of bits used for the Audio-Thumbprint (variable "numAuThBits") and the variable "extension type" (specifying the extension type in Extension_ payload( ). In the given example "numAlignBits" is equal to four. "AudioThumbprintData( )" returns the total number of bytes that are read.

TABLE 2

Syntax of extension_payload( )

| Syntax | No. of bits | Mnemonic |
|---|---|---|
| Extension_payload(cnt) { | | |
|    extension_type; | 4 | uimsbf |
|    align = 4; | | |
|    switch( extension_type ) { | | |
|      case EXT_DYNAMIC_RANGE: | | |
|        return dynamic_range_info( ); | | |
|      case EXT_AUDIO_THUMBNAIL: | | |
|        return AudioThumbprintData( ); | | |
|      case EXT_SBR_DATA: | | |
|        return sbr_extension_data(id_aac, 0); | | |
|      case EXT_SBR_DATA_CRC: | | |
|        return sbr_extension_data(id_aac, 1); | | |
|      case EXT_FILL_DATA: | | |
|        fill_nibble; /* must be '0000' */ | 4 | uimsbf |
|        for (i=0; i<cnt-1; i++) { | | |
|          fill_byte[i]; /* must be '10100101' */ | 8 | uimsbf |
|        } | | |

TABLE 2-continued

Syntax of extension_payload( )

| Syntax | No. of bits | Mnemonic |
|---|---|---|
|       return cnt;<br>   case EXT_DATA_ELEMENT:<br>      data_element_version; | 4 | uimsbf |
|       switch( data_element_version ) {<br>      case ANC_DATA:<br>         loopCounter = 0;<br>         dataElementLength = 0;<br>         do {<br>            dataElementLengthPart; | 8 | uimsbf |
|             dataElementLength += dataElementLengthPart;<br>            loopCounter++;<br>         } while (dataElementLengthPart == 255);<br>         for (i=0; i<dataElementLength; i++) {<br>            data_element_byte[i]; | 8 | uimsbf |
|          }<br>         return (dataElementLength+loopCounter+1);<br>      case default:<br>         align = 0;<br>      }<br>   case EXT_FIL:<br>   case default:<br>      for (i=0; i<8*(cnt−1)+align; i++) {<br>         other_bits[i]; | 1 | uimsbf |
|       }<br>      return cnt;<br>   }<br>} | | |

TABLE 3

Syntax of AudioThumbprintData( )

| Syntax | Number of bits |
|---|---|
| AudioThumbprintData( )<br>{<br>   numAuThBits = 0;<br>   BS_SECTION_ID | 2 |
|    numAuThBits += 2;<br>   if (BS_SECTION_ID == 3)<br>   {<br>      BS_NUM_CHAR | 8 |
|       numAuThBits += 8;<br>         for (i=0; i<BS_NUM_CHAR; i++)<br>         {<br>            BS_ARTIST_STRING[i] | 8 |
|             numAuThBits += 8;<br>         }<br>   }<br>   BS_START | 18 |
|    numAuThBits +=18;<br>   BS_LENGTH | 14 |
|    numAuThBits +=14;<br>   numAlignBits = 8*cnt − 4 − numAuThBits;<br>   BS_FILL_BITS | numAlignBits |
|    return((numAuThBits + numAlignBits + 4)/8);<br>} | |

Note:
cnt is a parameter in extension_payload

Figure 1:
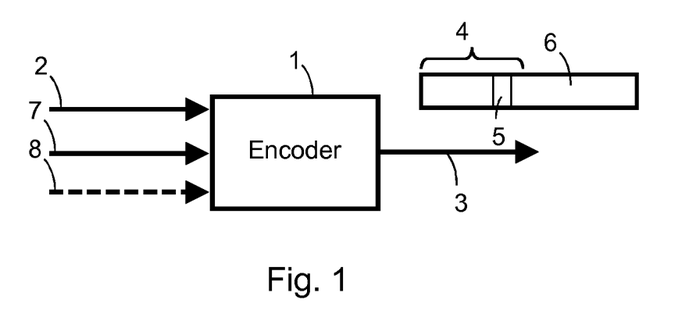
FIG. 1 illustrates a schematic embodiment of an encoder for encoding time marking information.

FIG. 1 illustrates an exemplary embodiment of an encoder 1 for encoding time marking information. The encoder receives an audio signal 2. The audio signal 2 may be a PCM (pulse code modulation) encoded audio signal 2 or may be a perceptual encoded audio bitstream, such as an MP3 bitstream, a Dolby Digital bitstream, a conventional HE-AAC bitstream or a Dolby Pulse bitstream. The audio signal 2 may also be a multi-media transport format such as e.g. "MP4" (MPEG-4 part-14) or any of the previously mentioned audio bitstream formats extended with a metadata container (such as e.g. "ID3"). The audio signal 2 comprises an audio object such as a piece of music. The encoder 1 further receives time marking data 7 which indicate one or more sections (such as the most characteristic part) in the audio object. The time marking data 7 may be automatically identified, e.g. by a Music Information Retrieval (MIR) algorithm, or may be manually entered. The encoder 1 may further receive labeling information 8 for labeling the one or more marked sections.

Based on the signals 2, 7 and optionally 8, the encoder 1 generates a bitstream 3 including the audio object and including time marking information for marking the one or more sections in the audio object. The bitstream 3 may be an MP3 bitstream, a Dolby Digital bitstream, an HE-AAC bitstream or a Dolby Pulse bitstream, which differentiates from a conventional bitstream in that the bitstream includes the time marking information and the optional associated labeling information. The bitstream 3 may also be a multi-media transport format such as e.g. "MP4" (MPEG-4 part-14) or any of the previously mentioned audio bitstream formats extended with a metadata container (such as e.g. "ID3"). The bitstream 3 may be stored as an audio file in a memory medium (not shown), such as a flash-memory or a hard-disk, for later playback or may be streamed in a streaming application (such as internet radio).

The bitstream 3 may comprise a header section 4. The header section 4 may comprise a time marking metadata section 5 having encoded time marking information and associated labeling information. The time marking information may comprise the start and stop points for the one or more marked sections, or the respective start point and the respective duration of the one or more marked sections. The time marking metadata section 5 may be included in a metadata container as discussed above. The bitstream 3 further comprises the audio object 6. Thus, time information of the one or more sections is included into the metadata of the bitstream, which enables to navigate e.g. to a significant part of audio object.

Figure 2:
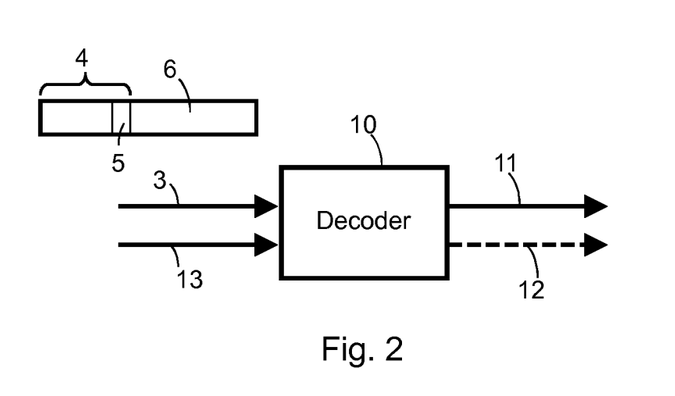
FIG. 2 illustrates a schematic embodiment of a decoder for decoding time marking information.

FIG. 2 illustrates an exemplary embodiment of a decoder 10 configured for decoding of the bitstream 3 as generated by the encoder 1. The decoder 10 generates an audio signal 11 based on the bitstream 3, such as a PCM audio signal 11. The decoder 10 is typically part of a consumer device for audio playback (in particular music playback), such as a portable music player without cellular telephone functionality, a cellular telephone with music player functionality, a notebook, a settop box or a DVD player. The consumer device for audio playback may be also used for combined audio/video playback. The decoder 10 further receives a selection signal 13. In dependency of the selection signal 13 the decoder 10 either jumps to a marked section of the audio object and performs decoding of the marked section, or performs normal decoding of the audio object from the beginning to the end of the audio object. When the decoder jumps to the marked section of the audio object, the consumer device starts playback at the marked section.

The decoder 10 may optionally further output decoded labeling information 12 which may be input into a display driver (not shown) to be displayed on a display of the device.

In the present document a method and system for encoding time marking information as metadata within audio date is described. This time marking information allows a music consumer to rapidly identify characteristic parts of an audio file.

The methods and systems described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the internet. Typical devices making use of the methods and systems described in the present document are portable electronic devices or other consumer equipment which are used to store and/or render audio signals. The methods and system may also be used on computer systems, e.g. internet web servers, which store and provide audio signals, e.g. music signals, for download.

The invention claimed is:

1. A method for encoding time marking information within audio data, wherein the audio data is a bitstream, the method comprising:
   encoding time marking information as audio metadata within the audio data, thereby forming a joint bitstream, wherein the time marking information indicates a plurality of sections of an audio object in the audio data; wherein the time marking information is encoded in multiple positions of the audio data; wherein the multiple positions occur at a particular occurrence rate in the audio data bitstream; wherein time marking information in a given position of the multiple positions is specified in relation to the occurrence of the given position in the audio data bitstream; and wherein the time marking information is encoded in a metadata container of the joint bitstream; thereby enabling a corresponding decoder to start playback of the audio object at a beginning of a section of the audio object indicated by the time marking information.

2. The method of claim 1, wherein the audio object is a piece of music.

3. The method of claim 1, wherein the section is a characteristic part of the audio object.

4. The method of claim 3, wherein the audio object is a piece of music, and the section is the chorus, the refrain or a part thereof.

5. The method of claim 1, wherein the audio object is a piece of music, and the plurality of sections are different sections relating to the temporal musical structure of the piece of music.

6. The method of claim 5, wherein the plurality of sections include at least one of the following sections:
   an introduction,
   a verse,
   a refrain or chorus,
   a bridge, or
   a solo.

7. The method of claim 1, wherein the audio object is a piece of music, and the time marking information indicates at least one of the following:
   the occurrence of a specific instrument or instrument group within the piece of music,
   the occurrence of a singing voice,
   the loudest part of the piece of music,
   a theme,
   a motive, or
   a variation of a theme.

8. The method of claim 1, wherein the time marking information specifies
   a start position and
   an end position or duration of the section.

9. The method of claim 1, the method comprising:
   encoding labeling information in the audio data, the labeling information labeling the plurality of sections of the audio object; wherein the labeling information is encoded as metadata of the joint bitstream.

10. The method of claim 9, wherein the audio object is a piece of music, and wherein the time marking information indicates a section having a particular musical property, and wherein the labeling information describes the particular musical property for the section.

11. The method of claim 10, wherein the musical property includes one of the following:
    a particular tempo,
    a particular articulation,
    a particular mood,
    a particular tonality, or
    a particular musical style or genre.

12. The method of claim 9, wherein the labeling information is encoded as a text label.

13. The method of claim 9, wherein the labeling information is encoded as an index of a table.

14. The method of claim 1, wherein the time marking information comprises
    a second value,
    a second value and fractional second value,
    a sample number,
    a frame number,
    an integer frame number and an integer sample number, or
    an integer frame number and a fractional frame value.

15. The method of claim 1, wherein the time marking information is encoded in
    an extension payload container of MPEG-2 or -4 AAC audio data, or
    a metadata container compliant with MPEG-4 Part 12.

16. A method for decoding time marking information in a joint bitstream comprising audio data and audio metadata, the method comprising:
    decoding time marking information provided as the audio metadata in the joint bitstream, the time marking information indicating a plurality of sections of an audio object encoded in the audio data; wherein the time marking information is encoded in multiple positions of the audio data; and wherein the time marking information is encoded in a metadata container of the joint bitstream; wherein time marking information in a given position of the multiple positions is specified in relation to the occurrence of the given position in the audio data bitstream; and wherein the multiple positions occur at a particular occurrence rate in the audio data bitstream; thereby enabling to start playback of the audio object at a beginning of a section of the audio object indicated by the time marking information.

17. An encoder configured to encode time marking information as audio metadata within audio data, wherein the audio data is a bitstream, thereby forming a joint bitstream; wherein the time marking information indicates a plurality of sections of an audio object encoded in the audio data; wherein the time marking information is encoded in multiple positions of the audio data; wherein the multiple positions occur at a particular occurrence rate in the audio data bitstream; wherein time marking information in a given position of the multiple positions is specified in relation to the occurrence of the given position in the audio data bitstream; and wherein the time marking information is encoded in a metadata container of the joint bitstream; thereby enabling a corresponding decoder to start playback of the audio object at a beginning of a section of the audio object indicated by the time marking information.

18. A decoder configured to decode time marking information provided as audio metadata in a joint bitstream comprising audio data, wherein the time marking information indicates a plurality of sections of an audio object encoded in the audio data; wherein the time marking information is encoded in multiple positions of the audio data; wherein the multiple positions occur at a particular occurrence rate in the audio data bitstream; wherein time marking information in a given position of the multiple positions is specified in relation to the occurrence of the given position in the audio data bitstream; and wherein the time marking information is encoded in a metadata container of the joint bitstream; thereby enabling the decoder to start playback of the audio object at a beginning of a section of the audio object indicated by the time marking information.

19. A non-transitory computer readable storage medium, storing software instructions, for encoding time marking information within audio data wherein the audio data is a bitstream, which when executed by one or more processors cause performing:

encoding time marking information as audio metadata within the audio data, thereby forming a joint bitstream, wherein the time marking information indicates a plurality of sections of an audio object in the audio data; wherein the time marking information is encoded in multiple positions of the audio data; wherein the multiple positions occur at a particular occurrence rate in the audio data bitstream; wherein time marking information in a given position of the multiple positions is specified in relation to the occurrence of the given position in the audio data bitstream; and wherein the time marking information is encoded in a metadata container of the joint bitstream; thereby enabling a corresponding decoder to start playback of the audio object at a beginning of a section of the audio object indicated by the time marking information.

\* \* \* \* \*